(12) United States Patent
Iyer et al.

(10) Patent No.: US 11,928,511 B2
(45) Date of Patent: Mar. 12, 2024

(54) SYSTEMS AND METHODS FOR PRIORITIZING MEMORY ALLOCATION FOR ISOLATED COMPUTING WORKSPACES EXECUTING ON INFORMATION HANDLING SYSTEMS

(71) Applicant: DELL PRODUCTS L.P., Round Rock, TX (US)

(72) Inventors: Vivek V. Iyer, Austin, TX (US); Anantha K. Boyapalle, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 17/513,701

(22) Filed: Oct. 28, 2021

(65) Prior Publication Data

US 2023/0133544 A1 May 4, 2023

(51) Int. Cl.
*G06F 9/50* (2006.01)
(52) U.S. Cl.
CPC ............ *G06F 9/5016* (2013.01); *G06F 9/505* (2013.01)
(58) Field of Classification Search
CPC ................................ G06F 9/5016; G06F 9/505
USPC ......................................................... 711/170
See application file for complete search history.

(56) References Cited

U.S. PATENT DOCUMENTS

| | | | |
|---|---|---|---|
| 2002/0104097 A1* | 8/2002 | Jerding | H04L 69/24 725/115 |
| 2008/0109629 A1* | 5/2008 | Karamcheti | G06F 3/064 711/170 |
| 2014/0176583 A1* | 6/2014 | Abiezzi | G06F 9/5044 345/522 |
| 2017/0097851 A1* | 4/2017 | Chen | G06F 9/45558 |
| 2018/0013636 A1* | 1/2018 | Seetharamaiah | G06F 9/5077 |
| 2018/0181323 A1* | 6/2018 | Li | G06F 11/1441 |
| 2018/0260135 A1* | 9/2018 | Hayashida | G06F 13/1673 |
| 2020/0184068 A1* | 6/2020 | Blanco | G06F 9/485 |
| 2020/0348973 A1* | 11/2020 | Kutch | H04L 41/046 |
| 2022/0012339 A1 | 1/2022 | Martinez | |
| 2022/0121467 A1* | 4/2022 | Bonnal Conduzorgues | G06F 9/5077 |

OTHER PUBLICATIONS

Intel, "Selection Guide—Affordably Accommodate the Next Wave of Data Demands", Obtained from Internet on Aug. 11, 2021, 7pgs.
Docker, "The Industry-Leading Container Runtime", Obtained from Internet on Oct. 12, 2021, 7 pgs.

(Continued)

*Primary Examiner* — Prasith Thammavong
*Assistant Examiner* — Sidney Li
(74) *Attorney, Agent, or Firm* — Egan, Enders & Huston LLP.

(57) ABSTRACT

Systems and methods are provided for prioritizing system memory for separate isolated computing workspaces (e.g., cloud-based software containers) that are executing together on an information handling system by reallocating higher performance system memory to higher-ranked computing workspace/s. In one example, the disclosed systems and methods may be implemented to optimize system memory usage for memory-heavy heterogeneous workloads of workspaces that are simultaneously executing together as modern clients on an information handling system.

20 Claims, 4 Drawing Sheets

(56) References Cited

OTHER PUBLICATIONS

Intel, "Clear Containers 1:The Container Landscape", Obtained from Internet on Oct. 13, 2021, 4 pgs.
Superuser, "How do you set memory priority (not cpu priority) on windows", Obtained from Internet on Oct. 12, 2021. 3 pgs.
CenturyLink Cloud Developer Center, "How to Maximize Your Docker Image Caching Techniques", Obtained from Internet on Oct. 12, 2021, 7 pgs.
Intel, "Intel Optane Persistent Memory", Aug. 11, 2021, 2 pgs.
Intel, "Intel Optane Persistent Memory", Obtained from Internet on Oct. 13, 2021, 2 pgs.
Intel, "Intel Optane Technology", Obtained from Internet on Aug. 12, 2021, 8 pgs.
Intel, "Application Note Intel Optane DC Persistent Memory—Content Delivery Networks Use Case", 2019, 8 pgs.
Lily Looi et al.,"Intel Optane Data Center Persistent Memory Presentation", Aug. 19, 2019, 25 pgs.
Superuser, "Limiting use of RAM in Chrome?", Obtained from Internet on Oct. 12, 2021, 9 pgs.
Lenovo Press, "Analyzing the Performance of Intel Optane DC Persistent Memory in Storage over App Direct Mode", Apr. 19, 2019, 13 pgs.
Intel, "Maximize Your Database Density and Performance", Obtained from Internet on Aug. 11, 2021, 18 pgs.
Intel, "Product Brief: Welcome the the Storage Media Revolution", Obtained from Internet on Oct. 13, 2021, 4 pgs.
Intel, "Product Brief: Achieve Greater Insight from Your Data with Intel Optane Persistent Memory", Obtained from Internet on Oct. 13, 2021, 8 pgs.
Intel, "Intel Optane DC Technology Frequently Asked Questions", Apr. 2019, 7 pgs.
Omem.io, "Persistent Memory Programming", Obtained from Internet on Oct. 13, 2021, 67 pgs.
Intel, "QSG Part 1 Provisioning with Intel Optane PMEM", Obtained from Internet on Aug. 11, 2021, 11 pgs.
Intel, "QSG Part 2 Provisioning with Intel Optane PMEM—Linux", Obtained from Internet on Aug. 11, 2021, 9 pgs.
Intel, "QSG Part 3 Provisioning with Intel Optane PMEM—Windows", Obtained from Internet on Aug. 11, 2021, 8 pgs.
Weiland et al., Nextgenio, "An Early Evaluation of Intel's Optane DC Persistent Memory Module and its Impact on High-Performance Scientific Applications", Obtained from Internet on Oct. 13, 2021, 24 pgs.
Docker.com, "Use containers to Build, Share and Run your applications", Obtained from Internet on Oct. 12, 2021, 13 pgs.
Architecting.It, "architechtingit", Sep. 8, 2020, 12 pgs.

* cited by examiner

SYSTEMS AND METHODS FOR PRIORITIZING MEMORY ALLOCATION FOR ISOLATED COMPUTING WORKSPACES EXECUTING ON INFORMATION HANDLING SYSTEMS

FIELD OF THE INVENTION

This application relates to information handling systems and, more particularly, to system memory allocation isolated workspaces executing on information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.
Information handling systems of the same type are typically manufactured and shipped to end users with a In a typical enterprise productivity use-case, a user workspace running on an information handling system is executed in an isolated environment, e.g., such as a virtual machine or a software container. A software container is a standalone executable package of isolated software code that includes at least one application and all its dependencies, including system libraries, system tools, settings, etc. Examples of software containers include Docker container images that are configured to run on a Docker Engine, available from Docker, Inc., of Palo Alto, California.

There are conventional use cases that are directed to application workloads handled by user workspaces (such as software containers) that require high memory and input/output (I/O) operations for all or a subset of the data being accessed by the workspace for performing memory read-write operations to support the application workload. Examples include productivity (precision) use cases executing software application models that require high memory, such as ArchiCAD, Solidworks, or video editing application workloads such as AdobePremier that are typically limited by available memory resources and responsiveness to showing only length snippets. Even common productivity applications (such as Microsoft PowerPoint) may experience slow responsiveness and memory bottlenecks, especially for "lastused" or "frequentlyused" content as well as for "rich" content having high amounts of video and other metadata. Additionally, applications such as a Windows PowerPoint Universal Windows Platform (UWP) instance executing in a container/workspace may exhibit slower responsiveness than desired due to memory bottlenecks.

It is known to use operating system (OS) and system-on-a-chip (SOC) hooks to optimize memory intensive workloads for local native application clients that execute directly on the host operating system of an information handling system and that do not execute in an isolated workspace such as a software container or virtual machine. Concurrent memory/storage workload optimization has also been employed for native application clients that execute directly on the host operating system of an information handling system and that do not execute in an isolated workspace such as a software container or virtual machine.

SUMMARY OF THE INVENTION

Disclosed herein are systems and methods for prioritizing system memory for computing workspaces in the form of cloud-based software containers that are executing together on an information handling system. In one exemplary embodiment, the disclosed systems and methods may be implemented to optimize system memory usage for memory-heavy heterogeneous workloads of workspaces that are simultaneously executing together as modern clients on an information handling system (e.g., such as an information handling system platform that is simultaneously running application workloads of multiple different cloud-based software container workspaces in a non-native manner).

In one embodiment, the disclosed systems and methods may be implemented to deallocate existing memory allocations for workspaces that are simultaneously executing together on a host programmable integrated circuit of an information handling system, and to reallocate identified specific memory intensive workspaces currently executing on an information handling system to platform attested higher-speed system memory (e.g., such as DRAM Near Memory of Intel Optane 2LM memory), while at the same time reallocating other less memory intensive workspaces currently executing on the same information handling system to lower-speed system memory (e.g., such as PMEM Far Memory of Intel Optane 2LM memory). In this way, system memory usage may be optimized for memory-heavy heterogeneous workloads in modern clients with platform and OS specific attested optimizations, e.g., such as Intel 2LM, PMEM, etc.

In one respect, disclosed herein is a method that includes executing at least one software container workspace on a host programmable integrated circuit of a first information handling system, with the host programmable integrated circuit being coupled to access relatively higher performance system memory and relatively lower performance system memory. The method may include performing the following in real time while executing the at least one software container workspace on the host programmable integrated circuit of the first information handling system: monitoring system memory requirements of the at least one software container workspace while it is executing on the host programmable integrated circuit; determining an amount of the relatively higher performance system memory required by the executing software container workspace to meet the real time monitored system memory requirements of the at least one software container workspace; allocating the determined amount of relatively higher performance system memory to the executing software container workspace; assigning the allocated amount of relatively higher performance system memory to the executing software container workspace; and executing at least one software container workspace on the host programmable integrated circuit of the first information handling system while using the assigned amount of relatively higher performance system memory to store data for operation of the executing software container workspace.

In another respect, disclosed herein is an information handling system, including: relatively higher performance system memory and relatively lower performance system memory; and a host programmable integrated circuit coupled to access the relatively higher performance system memory and the relatively lower performance system memory, the host programmable integrated circuit executing at least one software container workspace. The host programmable integrated circuit may be programmed to perform the following in real time while executing the at least one software container workspace: monitor system memory requirements of the at least one software container workspace while it is executing on the host programmable integrated circuit, determine an amount of the relatively higher performance system memory required by the executing software container workspace to meet the real time monitored system memory requirements of the at least one software container workspace, allocate the determined amount of relatively higher performance system memory to the executing software container workspace, assign the allocated amount of relatively higher performance system memory to the executing software container workspace; and execute at least one software container workspace on the host programmable integrated circuit of the first information handling system while using the assigned amount of relatively higher performance system memory to store data for operation of the executing software container workspace.

DESCRIPTION OF ILLUSTRATIVE EMBODIMENTS

Figure 1:
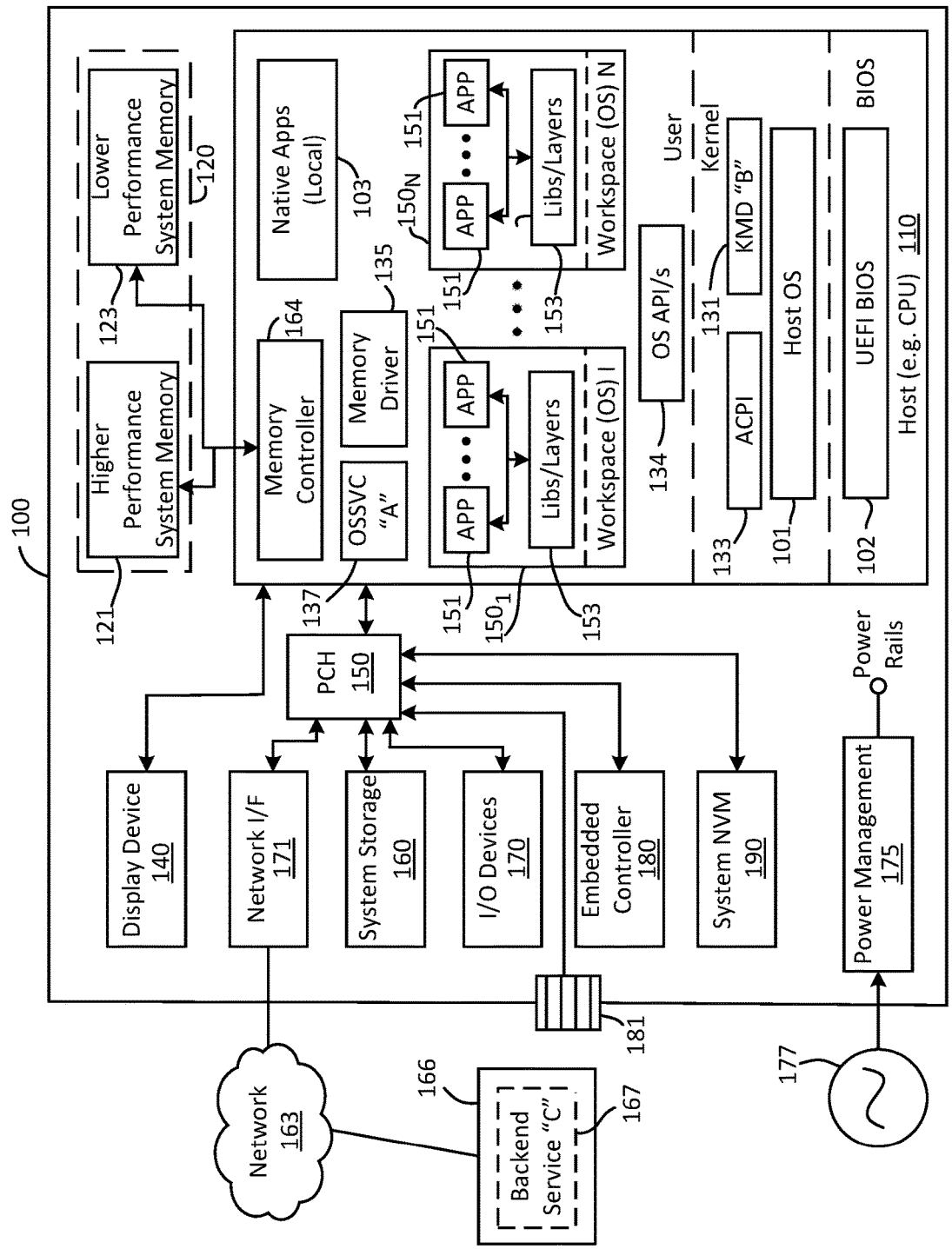
FIG. 1 illustrates a block diagram of an information handling system according to one exemplary embodiment of the disclosed systems and methods.

FIG. 1 is a block diagram of an information handling system 100 (e.g., a desktop computer, server, laptop computer, tablet computer, etc.) as it may be coupled via a network 163 to at least one other information handling system 166 according to one embodiment of the disclosed systems and methods. In this regard, it should be understood that the configuration of FIG. 1 is exemplary only, and that the disclosed methods may be implemented on other types of information handling systems. It should be further understood that while certain devices and components of an information handling system are shown in FIG. 1 for illustrating embodiments of the disclosed systems and methods, the information handling system is not restricted to including only those devices and components shown in FIG. 1 and described below.

As shown in FIG. 1, information handling system 100 may include a host programmable integrated circuit 110 that executes a host operating system (OS) 101 (e.g., such as Microsoft Windows 10, Linux, etc.) and unified extensible firmware interface BIOS 102 for system 100, and other code that includes local native software applications 103 (e.g., word processing application, Internet browser, computer game, PDF viewer, spreadsheet application, etc.). Host programmable integrated circuit 110 may include any type of processing device, such as an Intel central processing unit (CPU), an Advanced Micro Devices (AMD) CPU or another programmable integrated circuit.

As further shown in FIG. 1, host programmable integrated circuit 110 also executes one or more separate cloud-based modern client computing workspaces $150_1$ to $150_N$ (e.g., such as a number of separate cloud-based software containers with the total number being represented by "N" which may an integer number greater than 1 such as 2, 3, 4, 5, 6, etc.) that each provides a separate isolated computing environment that executes one or more cloud-based modern client software applications 151 along with libraries and layers 153 required for executing the same. In this regard, each computing workspace 150 provides a computing environment that is separate and isolated from host OS 101. In one embodiment, a computing workspace 150 may execute an OS that may be of the same or different type than host OS 101. An example of the latter case is where a given computing workspace 150 runs a Linux OS for executing its respective application/s 151, while at the same time the executing host OS 101 is a Windows OS. It will be understood that in one embodiment, a given cloud-based software container may include multiple different applications 151 with varying levels of isolation or containerization.

Also shown executing on host programmable integrated circuit 110 of system 100 is a kernel mode driver (KMD) 131, advanced configuration and power interface (ACPI) 133, OS application programming interface/s (API/s) 134 and OS service 137, the tasks of which are described further herein. An integrated memory controller 164 also executes within host programmable integrated circuit 110 to manage reads and writes to volatile system memory 120 that is coupled as shown to host programmable integrated circuit 110.

In the illustrated embodiment, volatile system memory 120 includes relatively higher performance system memory component 121 (e.g., relatively higher read/write speed memory) and relatively lower performance system memory component 123 (e.g., relatively lower read/write speed memory). Relatively higher performance system memory component 121 and relatively lower performance memory component 123 may each contain any suitable type of memory device/s having different memory read/write speeds relative to each other.

For example, in one embodiment, volatile system memory 120 may implemented using Intel Optane system memory technology available from Intel Technology Company of Santa Clara, California In such an embodiment, higher performance system memory component 121 may be implemented by volatile dynamic random access memory (Intel DRAM) "Near Memory", and lower performance system memory component 123 may be implemented by persistent non-volatile memory (Intel PMEM) that is operating as volatile "Far Memory". In this regard, Intel Optane system memory may be operated in a "memory mode" (2LM mode) under the control of memory driver 135, in which the system DRAM 121 is used as volatile Near Memory that acts as a memory cache, while the PMEM is used as a volatile Far Memory that stores non-cached data in a volatile condition. During operation, reads of cached data are returned from the volatile DRAM Near Memory cache at faster DRAM speeds, while reads of non-cached data is returned from volatile PMEM Far Memory at slower persistent memory speeds.

However, it will be understood that in other embodiments, higher performance system memory component 121 and lower performance system memory component 123 of volatile system memory 120 may each include any type of memory devices (e.g., DRAM, static random access memory "SRAM", synchronous DRAM "SDRAM", Flash, etc.) that may be operated as volatile memory components having different respective memory read/write speed performance characteristics relative to each other. For example, higher performance system memory component 121 may include DRAM memory device/s, and lower performance system memory component 123 may include DRAM memory device/s having a memory read/write speed that is lower (or slower) than the read/write speed of higher performance system memory component 121. Further, in some embodiments, volatile system memory 120 may include memory components having more than two levels of memory performance, e.g., such as a first higher performance system memory component having a higher memory read/write speed than the memory read/write speed of a second intermediate performance system memory component which in turn has a higher memory read/write speed than the memory read/write speed performance of a third lower performance system memory component.

Still referring to FIG. 1, host programmable integrated circuit 110 may be coupled to an external or internal (integrated) display device 140 (e.g., LCD or LED display or other suitable display device) depending on the particular configuration of information handling system 100. In the illustrated embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide graphics capability for information handling system 100.

In the embodiment of FIG. 1, a platform controller hub (PCH) 150 is coupled to control certain data paths and manages information flow between devices and components of the information handling system 100. As such, PCH 150 may include one or more integrated controllers/microcontrollers and/or interfaces for controlling the data paths connecting PCH 150 with host programmable integrated circuit 110, system storage 160 (e.g., one or more media drives, such as hard disk drives, optical drives, NVRAM, Flash memory, solid state drives "SSDs", and/or any other suitable form of internal or external storage), external and/or integrated input/output (I/O) devices 170 (e.g., such as one or more of touchpad, keyboard, mouse, touchscreen and associated controllers thereof) forming at least a part of a user interface for the information handling system, network interface (I/F) device 171, system NVM 190 (e.g., serial peripheral interface (SPI) Flash memory) which stores firmware images and other code for operation of system 100, and embedded controller (EC) 180 that may be configured with a microcontroller or other programmable integrated circuit to perform functions such as power/thermal system management and to execute program instructions to boot information handling system 100, etc.

In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

In the embodiment of FIG. 1, I/O devices 170 may be coupled to PCH 150 of system 100 to enable a system user to input data and interact with information handling system 100, and to interact with application programs or other software/firmware executing thereon. Information handling system 100 may include other system devices which may be coupled to host programmable integrated circuit 110, for example, by PCH 150. Examples of such system devices include, but are not limited to, external data bus connection interfaces 181 (e.g., such as Universal Serial Bus (USB) or Thunderbolt bus interfaces).

In the embodiment of FIG. 1, information handling system 100 is configured as an endpoint client device (or endpoint client information handling system) that is coupled via network 163 (e.g., such as an internal corporate intranet and/or the Internet) to other remote information handling system/s (e.g., such as an administrative server or management console 166 that is running backend service 167). In this regard, network I/F device 171 of information handling system 100 may be present to enable wired and/or wireless communication with the remote system 166 running backend service 167 via network 163. Network I/F device 171 may in one embodiment be a network interface controller (NIC) which may communicate with network 163, optionally across an intervening local area network (LAN), wireless LAN (WLAN), cellular network, etc.

A power source for the information handling system 100 may be provided via an external power source (e.g., mains power 177) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more power-consuming devices of the information handling system 100, as well as to perform other power-related administrative tasks of the information handling system.

Figure 2A:
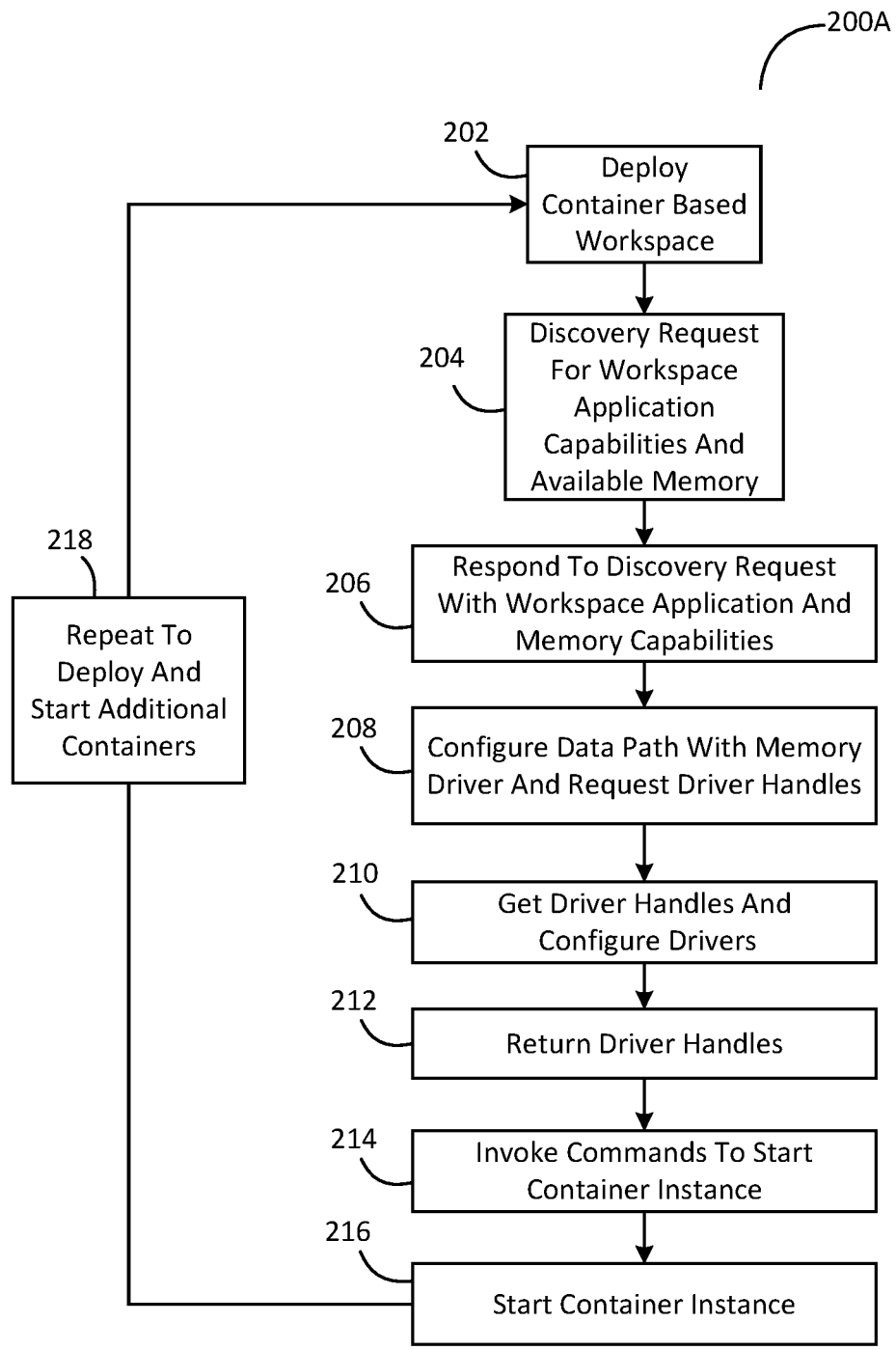
FIG. 2A illustrates methodology according to one exemplary embodiment of the disclosed systems and methods.
Figure 2B:
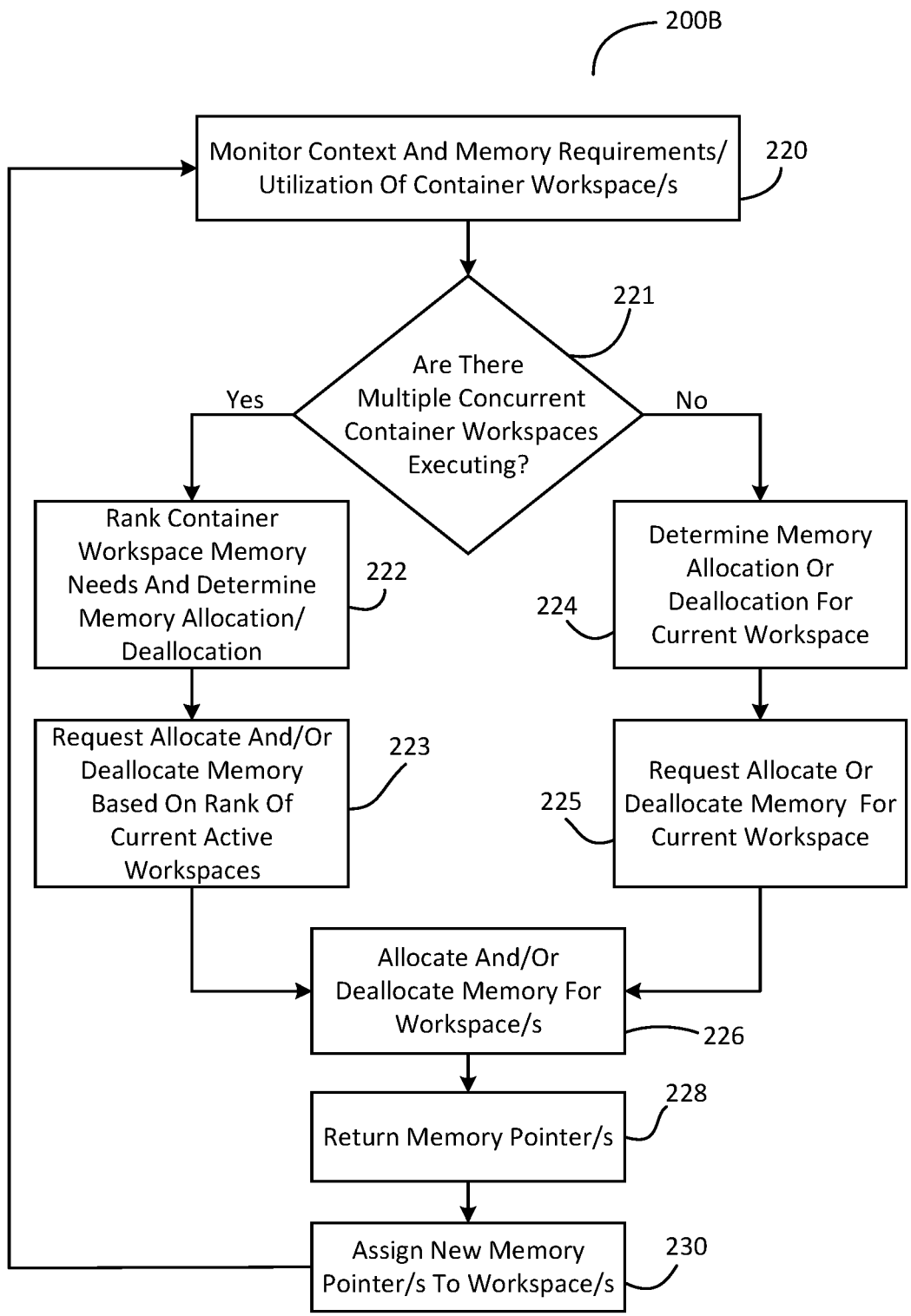
FIG. 2B illustrates methodology according to one exemplary embodiment of the disclosed systems and methods.
Figure 3:
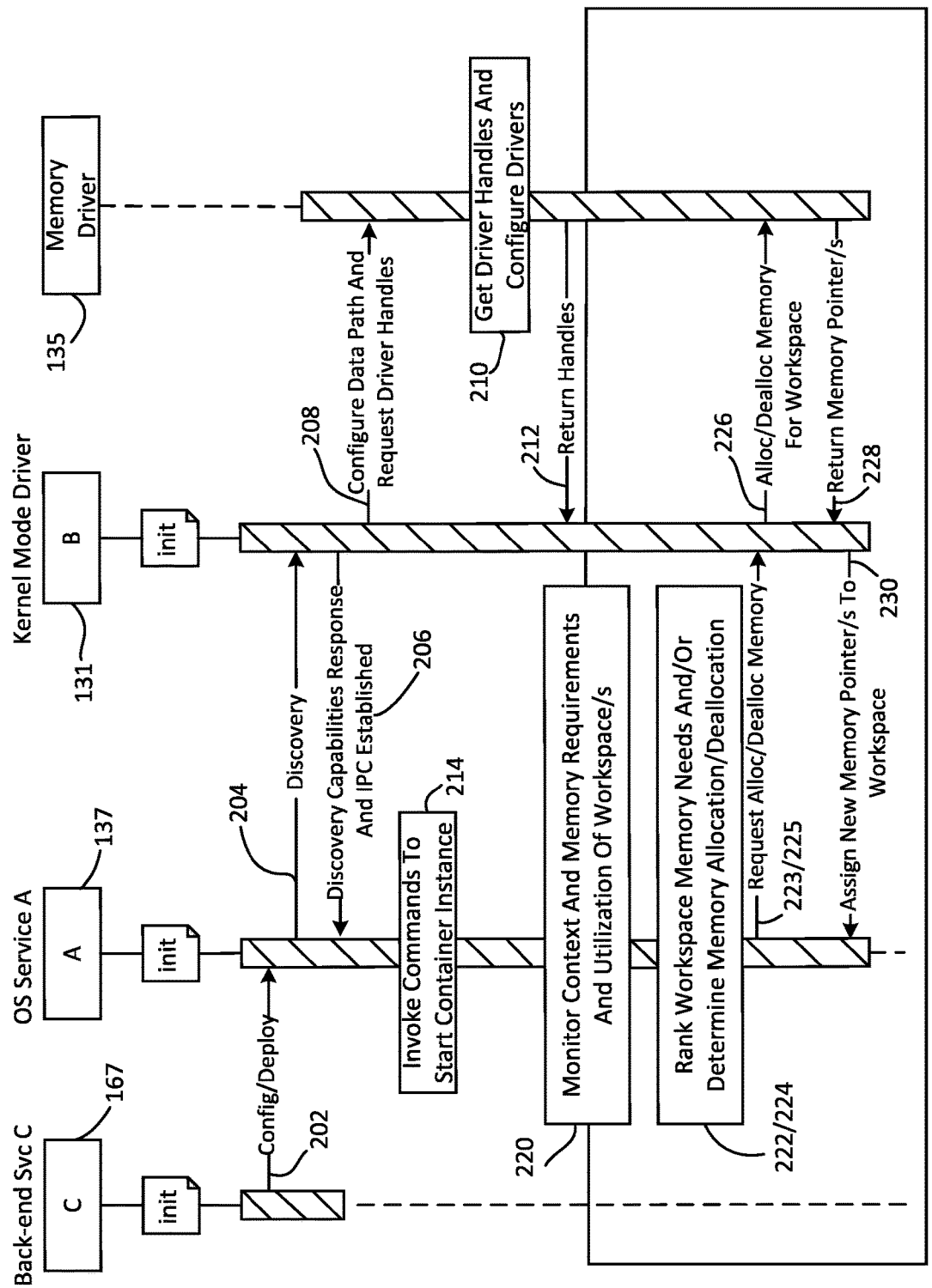
FIG. 3 illustrates sequential data communication and task implementation according to one exemplary embodiment of the disclosed systems and methods.

FIGS. 2A and 2B illustrate exemplary embodiments of methodologies 200A and 200B that may be implemented together to prioritize system memory 120 for use by one or more cloud-based modern client computing workspaces $150_1$ to $150_N$ that are executing on host programmable integrated circuit 110 of information handling system 100. FIG. 3 illustrates sequential data communication and task implementation 300 performed by components of FIG. 1 during the implementation of methodologies 200A and 200B of FIGS. 2A and 2B, respectively.

As shown in FIG. 2A, methodology 200A begins in block 202 where backend service "C" 167 deploys a current given cloud-based software container workspace 150 for executing one or more given software container application/s 151 across network 163 from remote system 166 to OS service "A" 137 that is executing on endpoint client system 100. Remote system 166 may be, for example, a management console or administrative server that is operated by an information technology decision maker (ITDM). OS service "A" 137 responds to the deployment of the current given software container workspace 150 in block 204 by issuing a request to kernel mode driver (KMD "B") 131 for discovery of application capabilities (e.g., such as graphics/render needs, input/output (I/O) needs, CPU threads and peak/average needs, etc.) for the given software container application/s 151, and for memory capabilities (e.g., such as peak usage, average use, memory latency needs, inter-communication memory caches needed, etc.) of system memory 120 from kernel mode driver (KMD "B") 131.

KMD "B" 131 responds to the discovery request of block 204 by providing a discovery response to OS service "A" 137 in block 206 that includes the requested application capabilities for the current given software container application/s 151 and the requested memory capabilities of system memory 120. In one embodiment, KMD "B" 131 also establishes Inter-Process Communication (IPC) protocol between individual software container workspace 150 and system (e.g., OS service "A" 137) in block 206 for purpose of exchanging capabilities at startup and change of session memory needs. Methodology 200A of FIG. 2A next proceeds to block 208 where KMD "B" 131 configures a data path with memory driver 135, and requests driver handles for the IPC of each software container workspace 150 from memory driver 135.

In block 210, memory driver 135 gets handles and configures drivers that require configuration based on capabilities of the current software container application/s 151 of the current given software container workspace 150, e.g., if a given software container application 151 requires graphics processing unit (GPU) specific capabilities (such as 4K Video), then the GPU drivers are configured to implement or operate with those capabilities. In block 212, memory driver 135 returns the requested driver handles to KMD "B" 131.

Still referring to FIG. 2A, OS service "A" 137 invokes appropriate commands to a container infrastructure process/agent (e.g., such as a user mode software service within OS APIs 134) in block 214 to start the instance of the current given cloud-based software container workspace 150 on host programmable integrated circuit 110. Examples of software container workspaces 150 include, but are not limited to, Docker container images that are configured to run on a Docker Engine, available from Docker, Inc., of Palo Alto, California In addition to a corresponding container engine or designated container OS, such an invoked instance of a software container workspace 150 includes everything needed to run its included application/s 151 (including required libraries and layers 153) such that these application/s 151 may be rapidly and uniformly executed within the software container workspace 150 in the same manner across different computing environments. In block 216, the instance of the current given cloud-based software container workspace 150 corresponding to the invoked commands of block 214 is started on host programmable integrated circuit 110, together with its application/s 151 and libraries and layers 153 required by its application/s 151.

In block 216, the instance of the current given cloud-based software container workspace 150 corresponding to the invoked commands of block 214 is started on host programmable integrated circuit 110, together with its application/s 151 and libraries and layers 153 required by its application/s 151. It will be understood blocks 202 to 216 of methodology 200A may be repeated as shown in block 218 to start additional different cloud-based software container workspaces 150 on host programmable integrated circuit 110 so that multiple cloud-based software container workspaces $150_1$ to $150_N$ are concurrently executing together on host programmable integrated circuit 110.

Referring now to methodology 200B of FIG. 2B, overall allocation to higher performance system memory 121 across concurrent workspaces may be managed by making changes in real time to memory mode for a given active container workspace 150 (e.g., from lower performance system memory 123 to higher performance system memory 121, and vice-versa) during steady state operation on host programmable integrated circuit 110 by making process reassignments using OS APIs 134 (e.g., such as Windows OS APIs)a.

For example, after one or more cloud-based software container workspace/s on host programmable integrated circuit 110 are started in methodology 200A, OS service "A" 137 may (in block 220 of FIG. 2B) continuously and in real time monitor user context, memory requirements and memory utilization of the current given cloud-based software container workspace 150, as well as user context, memory requirements and memory utilization of all other additional cloud-based software container workspace/s 150 that are concurrently executing on host programmable integrated circuit 100 with the current given cloud-based software container workspace 150. In this regard, the monitored user context of a given software container workspace 150 indicates whether or not a user of system 100 is currently interacting with the given software container workspace 150 via one or more I/O devices 170, display device 140, microphone, speaker, etc. of system 100 (e.g., by inputting data or mouse clicks, viewing images on display 140, outputting audio on a speaker of system 100 and/or speaking audio into a microphone of system 100, etc.). To perform block 220, OS service "A" 137 may continuously collect telemetry from within the container infrastructure process/agents of software container workspace/s 150 about the system performance of all the currently-running software container workspaces 150.

Next, if there are multiple active concurrent software container workspaces 150 executing on host programmable integrated circuit 110 in block 221, then OS service "A" 137 ranks the priority of monitored memory requirements of the currently-executing multiple concurrent software container workspaces 150 relative to each other based on the monitored user context from block 222. In one embodiment, OS service "A" 137 may employ a rank-based algorithm, e.g., such as weighted average scoring (Weighting memory utilization average/peak on scale of 1-100 against latency criticality score of 1-100), etc. to rank the priority of the memory needs of the different software container workspaces 150 based on monitored user context until full, e.g., by providing an ordered list of currently active software container workspaces 150 in decreasing order of memory usage priority.

Also in block 222, OS service "A" 137 may determine as needed (i.e., to meet the monitored real time required system memory needs of at least one higher-ranked active software container workspace 150) to request real time allocation of a determined amount of additional higher performance system memory 121 to the at least one higher-ranked (i.e., higher priority) active software container workspace 150, and if necessary (i.e., to free up sufficient higher performance system memory 121 to fulfill the allocation request) to request real time deallocation of a determined needed amount of higher performance system memory 121 that is already allocated to at least one lower-ranked (i.e., lower priority) active software container workspace 150 that is concurrently executing on the same host programmable integrated circuit 110.

As an example, assume that all of the higher performance system memory 121 of system 100 has been previously allocated to a first lower-ranked (i.e., lower priority) active software container workspace 150 that is running a first application 151 (e.g., such as Graphisoft ArchiCad) at the same time a second and higher-ranked (i.e., higher priority) software container workspace 150 is running a second application 151 (e.g., such as Zoom) that is determined based on monitored user context of block 220 to be actively being used by a user of system 100. At this time, OS service "A" 137 will determine (based on the workspace ranking of block 222) to request allocation of a determined amount of higher performance system memory 121 needed by the second and higher-ranked software container workspace 150 to the second and higher-ranked software container workspace 150. At the same time, OS service "A" 137 will request deallocation of all or a determined portion of higher performance system memory 121 from the first lower-ranked active software container workspace 150, e.g., if necessary to free up sufficient higher performance system memory 121 for running the second higher-ranked software container workspace 150.

It will be understood that any higher performance system memory 121 that is deallocated from first lower-ranked active software container workspace 150 may be replaced with lower performance system memory 123 that is reallocated to first lower-ranked active software container workspace 150. Further, where all of higher performance system memory 121 on system 100 is insufficient to meet all the memory requirements of second higher-ranked software container workspace 150, then sufficient lower performance system memory 123 may also be allocated to second higher-ranked software container workspace 150 to meet the full memory requirements of second higher-ranked software container workspace 150.

In one embodiment (e.g., such as where insufficient lower performance system memory 123 is available to be allocated or reallocated to first lower-ranked active software container workspace 150 to meet the full memory requirements of first lower-ranked active software container workspace 150), additional optional actions may be automatically taken as needed by OS service "A" 137 or other process executing on host programmable integrated circuit 110 to dynamically address such insufficient overall system memory 120 in real time by reducing current memory requirements for lower-ranked active container workspaces 150 or processes having a system memory requirement/s that exceeds a designated "memory cut line" or threshold amount of remaining available system memory 121 and/or 123 (e.g., a designated threshold memory amount as high as 100% of remaining available total system memory 121 and 123 or other designated lesser threshold memory amount, such as 95%, 90%, 85%, 80%, etc. of remaining available total system memory 121 and 123) that is available for reallocation. Examples of such additional actions include, but are not limited to, employing memory grouping allocation for critical (e.g., higher-ranked) active container workspaces 150 to avoid fragmentation issues, implementation of multi-tier caching for memory accesses for critical (e.g., higher-ranked) workspaces that is tied to system platform cache prioritization for critical (e.g., higher-ranked) active container workspaces 150, providing cloud native browser tab allocation of individual processes within a lower-ranked active container workspace 150 to the browser tab memory setting of memory driver 135 and/or limiting browser tab usage of system memory 120 by suspending execution of browser tabs of the browser, etc.

In block 223 of methodology 200B, OS service "A" 137 may make calls through OS APIs 134 to send the determined memory allocation and/or deallocation request/s (including corresponding determined amounts of allocated and deallocated higher-performance memory 121 and lower performance memory 123 to be implemented) to kernel mode driver (KMD "B") 131. KMD "B" 131 may in turn respond to the received memory allocation and/or deallocation request/s of block 223 by instructing the memory driver 135 in block 226 to perform the requested memory allocation and/or deallocation request/s of block 223. In this regard, KMD "B" 131 may act as a liaison between container workspace monitoring and memory allocation and deallocation decision-making tasks performed by OS service "A" 137 and the actual memory allocation and deallocation tasks performed by memory driver 135 (which has no awareness or knowledge of the user context, memory requirements and memory utilization of the cloud-based software container workspace/s 150 currently executing on host programmable integrated circuit 110).

In one embodiment, block 223 may be so performed to deallocate previous memory allocations for first lower-ranked software container workspace 150 and second higher-ranked software container workspace 150, and to then reallocate more (or all) higher performance memory 121 (than was allocated previously) to second higher-ranked software container workspace 150 while at the same time reallocating less (or none) of higher performance memory 121 (than was allocated previously) to first lower-ranked software container workspace 150. In such a case, more lower performance memory 123 may be reallocated to the first lower-ranked software container workspace 150 to replace the amount of reallocated higher performance memory 121 that was deallocated from first lower-ranked software container workspace 150.

Returning briefly to block 221, if there is only a single active software container workspace 150 executing on host programmable integrated circuit 110 in block 221, then in block 224 OS service "A" 137 determines the amount of system memory required by the active software container workspace 150 and as needed (i.e., to meet the required system memory needs of the active software container workspace 150) to request allocation of a determined amount of additional higher performance system memory 121 (needed by active software container workspace 150) to the active software container workspace 150, and if necessary (to free up sufficient determined amount of higher performance memory 121 to meet the allocation to request) to request deallocation of a determined needed amount of higher performance system memory 121 that is already allocated to another process/es that is concurrently executing on the same host programmable integrated circuit 110.

In block 228 of methodology 200B, memory driver 135 deallocates all previous higher performance memory 121 and lower performance memory 123 allocations, and returns new memory pointer/s (i.e., to implement the corresponding requested amounts of allocated and/or deallocated higher performance system memory 121 as specified by KMD "B" 131 in block 226) through OS APIs 134 to OS service "A" 137.

In block 230, OS service "A" 137 assigns the new memory pointer/s (received in block 228) to the corresponding cloud-based software container workspace/s 150 (e.g., to respective second higher-ranked container workspace 150 and first lower-ranked container workspace 150) currently executing on host programmable integrated circuit 110 to implement the requested memory allocation and/or deallocation determined by OS service "A" 137 in block 222. In the current example, second higher-ranked container workspace 150 is then executed by host programmable integrated circuit 110 using the newly allocated greater amount of higher performance memory 121 to temporarily store data for the operation of second higher-ranked container workspace 150, and first lower-ranked container workspace 150 is then executed by host programmable integrated circuit 110 using the newly allocated lesser amount of higher performance memory 121 to temporarily store data for the operation of first lower-ranked container workspace 150 (e.g., while at the same time using the newly allocated greater amount of lower performance memory 123 to meet the balance of system memory required by first lower-ranked container workspace 150 to temporarily store data for the operation of first lower-ranked container workspace 150). Methodology 200B then returns to block 220 and repeats as shown.

It will be understood that the methodologies, data communication and task implementations of FIGS. 2A, 2B and 3 are exemplary only, and that any other combination of additional, fewer and/or alternative steps may additionally or alternatively employed to prioritize system memory for use by one or more workspaces that are executing on a host programmable integrated circuit of an information handling system. For example, in one embodiment, the disclosed systems and methods may be implemented to segment a given workspace (e.g., such as a given one of active software container workspaces 150 executing on host programmable integrated circuit 110) into critical memory and non-critical memory areas, e.g., by performing blocks 220 to 230 of FIG. 2B on an individual application-level basis (as opposed to a software container workspace basis). In one example of such an alternate embodiment, software container isolation may be employed to monitor user context, as well as memory requirements and memory utilization, of one or more individual applications 151 that are currently executing within a given active software container workspace 150, and to perform memory priority assignments between multiple different applications 151 executing with the same given active software container workspace 150, e.g., so that higher performance system memory 121 is allocated to a first higher priority application 151 currently executing within the given active software container workspace 150 while at the same time lower performance system memory 123 is allocated to a second lower priority application 151 currently executing within the given active software container workspace 150.

It will also be understood that one or more of the tasks, functions, or methodologies described herein (e.g., including those described herein for components 101, 102, 103, 105, 107, 110, 131, 133, 134, 135, 137, 140, 150, 151, 153, 164, 166, 167, 171, 175, 180, etc.) may each be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising executing at least one software container workspace having multiple applications executing within the at least one software container workspace on a host programmable integrated circuit of a first information handling system, the host programmable integrated circuit being coupled to access higher performance system memory and lower performance system memory; and performing the following in real time while executing the at least one software container workspace and the multiple applications on the host programmable integrated circuit of the first information handling system:

monitoring system memory requirements of each of the multiple applications executing within the at least one software container workspace while it is executing on the host programmable integrated circuit;

determining an amount of the higher performance system memory required by each given one of the multiple applications executing within the executing software container workspace to meet the monitored system memory requirements of each given one of the multiple applications executing within the at least one software container workspace;

ranking a priority of the memory requirements of each of the multiple applications executing within the executing software container workspace relative to each other;

allocating a greater amount of higher performance system memory to at least one higher-ranked one of the multiple applications executing within the executing software container workspace and allocating a lesser amount of higher performance system memory to at least one lower-ranked one of the multiple applications executing within the executing software container workspace;

assigning the allocated greater amount of higher performance system memory to the at least one higher-ranked one of the multiple applications executing within the software container workspace, while at the same time assigning the allocated lesser amount of higher performance system memory to the at least one lower-ranked one of the multiple applications executing within the executing software container workspace; and simultaneously executing the multiple applications executing within the at least one software container workspace on the host programmable integrated circuit of the first information handling system while using the assigned greater amount of higher performance system memory to store data for operation of the at least one higher-ranked one of the multiple applications executing within the at least one software container workspace, and while using the assigned lesser amount of higher performance system memory to store data for operation of the at least one lower-ranked one of the multiple applications executing within the at least one software container workspace.

2. A method, comprising executing at least one software container workspace on a host programmable integrated circuit of a first information handling system, the host programmable integrated circuit being coupled to access higher performance system memory and lower performance system memory; and performing the following in real time while executing the at least one software container workspace on the host programmable integrated circuit of the first information handling system:

monitoring system memory requirements of the at least one software container workspace while it is executing on the host programmable integrated circuit;

determining an amount of the higher performance system memory required by the executing software container workspace to meet the monitored system memory requirements of the at least one software container workspace;

allocating the determined amount of higher performance system memory to the executing software container workspace;

assigning the allocated amount of higher performance system memory to the executing software container workspace; and executing at least one software container workspace on the host programmable integrated circuit of the first information handling system while using the assigned amount of higher performance system memory to store data for operation of the executing software container workspace;

where the method further comprises simultaneously executing multiple software container workspaces on the host programmable integrated circuit of the first information handling system, the simultaneously executing multiple software container workspaces including the at least one software container workspace; and performing the following in real time while executing the multiple software container workspaces on the host programmable integrated circuit of the first information handling system:

monitoring system memory requirements of each of the simultaneously executing software multiple container workspaces while they are executing on the host programmable integrated circuit, determining an amount of the higher performance system memory required by each given one of the simultaneously executing multiple software container workspaces to meet the monitored system memory requirements of each given one of the simultaneously executing multiple software container workspaces, ranking a priority of the memory requirements of each of the simultaneously executing multiple software container workspaces relative to each other, allocating a greater amount of higher performance system memory to at least one higher-ranked one of the simultaneously executing multiple software container workspaces and allocating a lesser amount of higher performance system memory to at least one lower-ranked one of the simultaneously executing multiple software container workspaces, assigning the allocated greater amount of higher performance system memory to the at least one higher-ranked one of the simultaneously executing multiple software container workspaces, while at the same time assigning the allocated lesser amount of higher performance system memory to the at least one lower-ranked one of the simultaneously executing multiple software container workspaces, and simultaneously executing the multiple software container workspaces on the host programmable integrated circuit of the first information handling system while using the assigned greater amount of higher performance system memory to store data for operation of the at least one higher-ranked one of the simultaneously executing multiple software container workspaces, while using the assigned lesser amount of higher performance system memory to store data for operation of the at least one lower-ranked one of the simultaneously executing multiple software container workspaces.

3. The method of claim 2, further comprising:
deallocating a first amount of higher performance system memory that is currently assigned to the at least one lower-ranked one of the simultaneously executing multiple software container workspaces;
reallocating and assigning the first amount of higher performance system memory to the at least one higher-ranked one of the simultaneously executing multiple software container workspaces;
reallocating and assigning a first amount of lower performance system memory to the at least one lower-ranked one of the simultaneously executing multiple software container workspaces to replace the deallocated first amount of higher performance system memory that was previously assigned to the at least one lower-ranked one of the simultaneously executing multiple software container workspaces; and
simultaneously executing the multiple software container workspaces on the host programmable integrated circuit of the first information handling system while using the assigned first amount of higher performance system memory to store data for operation of the at least one higher-ranked one of the simultaneously executing multiple software container workspaces, while using the assigned first amount of lower performance system memory to store data for operation of the at least one lower-ranked one of the simultaneously executing multiple software container workspaces.

4. The method of claim 2, further comprising:
deallocating a first amount of higher performance system memory that is currently assigned to the at least one lower-ranked one of the simultaneously executing multiple software container workspaces;
reallocating and assigning the first amount of higher performance system memory to the at least one higher-ranked one of the simultaneously executing multiple software container workspaces; and
reducing current memory requirements of the at least one lower-ranked one of the simultaneously executing multiple software container workspaces only if the system memory requirements of the at least one lower-ranked one of the simultaneously executing multiple software container workspaces exceeds a designated threshold amount of remaining available higher performance system memory and/or lower performance system memory that is available for reallocation to the at least one lower-ranked one of the simultaneously executing multiple software container workspaces after the reallocating and assigning the first amount of higher performance system memory to the at least one higher-ranked one of the simultaneously executing multiple software container workspaces.

5. The method of claim 2, where the ranking a priority of the memory requirements of each of the simultaneously executing multiple software container workspaces relative to each other comprises:
monitoring at least a respective user context of each of the simultaneously executing software multiple container workspaces while they are executing on the host programmable integrated circuit of the first information handling system; and
ranking the priority of the memory requirements of each of the simultaneously executing multiple software container workspaces relative to each other based on the monitored user context of each of the simultaneously executing software multiple container workspaces while they are executing on the host programmable integrated circuit of the first information handling system.

6. The method of claim 5, where the monitoring at least a respective user context of each given one of the simultaneously executing software multiple container workspaces comprises monitoring whether or not a user of the first information handling system is currently interacting with the given one of the simultaneously executing software multiple container workspaces.

7. The method of claim 2, where the first information handling system is an endpoint client information handling system that is coupled by at least one network to a second and remote information handling system, where the software container workspace is a cloud-based software container workspace, and where the method further comprises:
deploying the cloud-based software container workspace across the network from the remote information handling system to the endpoint client information handling system; and
starting an instance of the deployed cloud-based software container workspace to execute on the host programmable integrated circuit of the first information handling system.

8. The method of claim 2, further comprising reducing current memory requirements of the at least one lower-ranked one of the simultaneously executing multiple software container workspaces only if the system memory requirements of the at least one lower-ranked one of the simultaneously executing multiple software container workspaces exceeds a designated threshold amount of remaining available higher performance system memory and/or lower performance system memory that is available for reallocation to the at least one lower-ranked one of the simultaneously executing multiple software container workspaces after the allocating and the assigning of the determined amount of higher performance system memory to the at least one higher-ranked one of the simultaneously executing multiple software container workspaces.

9. The method of claim 2, where the higher performance system memory is volatile dynamic random access memory (DRAM) and where the lower performance system memory is persistent non-volatile memory.

10. A method, comprising executing at least one software container workspace on a host programmable integrated circuit of a first information handling system, the host programmable integrated circuit being coupled to access higher performance system memory and lower performance system memory; and performing the following in real time while executing the at least one software container workspace on the host programmable integrated circuit of the first information handling system:
monitoring system memory requirements of the at least one software container workspace while it is executing on the host programmable integrated circuit;
determining an amount of the higher performance system memory required by the executing software container workspace to meet the monitored system memory requirements of the at least one software container workspace;
allocating the determined amount of higher performance system memory to the executing software container workspace;
assigning the allocated amount of higher performance system memory to the executing software container workspace; and executing at least one software container workspace on the host programmable integrated circuit of the first information handling system while using the assigned amount of higher performance system memory to store data for operation of the executing software container workspace;

where the higher performance system memory is volatile dynamic random access memory (DRAM) and where the lower performance system memory is persistent non-volatile memory; and where the method further comprises using the lower performance persistent non-volatile memory to store data for operation of the executing software container workspace in a volatile condition on the persistent non-volatile memory.

11. An information handling system, comprising:

system memory comprising higher performance system memory and lower performance system memory; and a host programmable integrated circuit coupled to access the higher performance system memory and the lower performance system memory, the host programmable integrated circuit executing at least one software container workspace having multiple applications executing within the at least one software container workspace;

where the host programmable integrated circuit is programmed to perform the following in real time while executing the at least one software container workspace and the multiple applications:

monitor system memory requirements of each of the multiple applications executing within the at least one software container workspace while it is executing on the host programmable integrated circuit, determine an amount of the higher performance system memory required by each given one of the multiple applications executing within the executing software container workspace to meet the monitored system memory requirements of each given one of the multiple applications executing within the at least one software container workspace, rank a priority of the memory requirements of each of the multiple applications executing within the executing software container workspace relative to each other;

allocate a greater amount of higher performance system memory to at least one higher-ranked one of the multiple applications executing within the executing software container workspace and allocate a lesser amount of higher performance system memory to at least one lower-ranked one of the multiple applications executing within the executing software container workspace, assign the allocated greater amount of higher performance system memory to the at least one higher-ranked one of the multiple applications executing within the software container workspace, and at the same time assign the allocated lesser amount of higher performance system memory to the at least one lower-ranked one of the multiple applications executing within the executing software container workspace and simultaneously execute the multiple applications executing within the at least one software container workspace on the host programmable integrated circuit of the first information handling system while using the assigned greater amount of higher performance system memory to store data for operation of the at least one higher-ranked one of the multiple applications executing within the at least one software container workspace, and while using the assigned lesser amount of higher performance system memory to store data for operation of the at least one lower-ranked one of the multiple applications executing within the at least one software container workspace.

12. An information handling system, comprising:

system memory comprising higher performance system memory and lower performance system memory; and a host programmable integrated circuit coupled to access the higher performance system memory and the lower performance system memory, the host programmable integrated circuit executing at least one software container workspace;

where the host programmable integrated circuit is programmed to perform the following in real time while executing the at least one software container workspace:

monitor system memory requirements of the at least one software container workspace while it is executing on the host programmable integrated circuit, determine an amount of the higher performance system memory required by the executing software container workspace to meet the real time monitored system memory requirements of the at least one software container workspace, allocate the determined amount of higher performance system memory to the executing software container workspace, assign the allocated amount of higher performance system memory to the executing software container workspace; and execute at least one software container workspace on the host programmable integrated circuit of the first information handling system while using the assigned amount of higher performance system memory to store data for operation of the executing software container workspace; and where the host programmable integrated circuit is simultaneously executing multiple software container workspaces on the host programmable integrated circuit of the first information handling system, the simultaneously executing multiple software container workspaces including the at least one software container workspace; and where the host programmable integrated circuit is programmed to perform the following in real time while executing the multiple software container workspaces:

monitor system memory requirements of each of the simultaneously executing software multiple container workspaces while they are executing on the host programmable integrated circuit;

determine an amount of the higher performance system memory required by each given one of the simultaneously executing multiple software container workspaces to meet the monitored system memory requirements of each given one of the simultaneously executing multiple software container workspaces;

rank a priority of the memory requirements of each of the simultaneously executing multiple software container workspaces relative to each other;

allocate a greater amount of higher performance system memory to at least one higher-ranked one of the simultaneously executing multiple software container workspaces and allocating a lesser amount of higher performance system memory to at least one lower-ranked one of the simultaneously executing multiple software container workspaces;

assign the allocated greater amount of higher performance system memory to the at least one higher-ranked one of the simultaneously executing multiple software container workspaces, while at the same time assigning the allocated lesser amount of higher performance system memory to the at least one lower-ranked one of the simultaneously executing multiple software container workspaces; and simultaneously execute the multiple software container workspaces on the host programmable integrated circuit of the first information handling system while using the assigned greater amount of higher performance system memory to store data for operation of the at least one higher-ranked one of the simultaneously executing multiple software container workspaces, while using the assigned lesser amount of higher performance system memory to store data for operation of the at least one lower-ranked one of the simultaneously executing multiple software container workspaces.

13. The information handling system of claim 12, where the host programmable integrated circuit is further programmed to:

deallocate a first amount of higher performance system memory that is currently assigned to the at least one lower-ranked one of the simultaneously executing multiple software container workspaces;

reallocate and assign the first amount of higher performance system memory to the at least one higher-ranked one of the simultaneously executing multiple software container workspaces;

reallocate and assignee a first amount of lower performance system memory to the at least one lower-ranked one of the simultaneously executing multiple software container workspaces to replace the deallocated first amount of higher performance system memory that was previously assigned to the at least one lower-ranked one of the simultaneously executing multiple software container workspaces; and simultaneously execute the multiple software container workspaces on the host programmable integrated circuit of the first information handling system while using the assigned first amount of higher performance system memory to store data for operation of the at least one higher-ranked one of the simultaneously executing multiple software container workspaces, while using the assigned first amount of lower performance system memory to store data for operation of the at least one lower-ranked one of the simultaneously executing multiple software container workspaces.

14. The information handling system of claim 12, where the host programmable integrated circuit is further programmed to:

deallocate a first amount of higher performance system memory that is currently assigned to the at least one lower-ranked one of the simultaneously executing multiple software container workspaces;

reallocate and assign the first amount of higher performance system memory to the at least one higher-ranked one of the simultaneously executing multiple software container workspaces; and reduce current memory requirements of the at least one lower-ranked one of the simultaneously executing multiple software container workspaces only if the system memory requirements of the at least one lower-ranked one of the simultaneously executing multiple software container workspaces exceeds a designated threshold amount of remaining available higher performance system memory and/or lower performance system memory that is available for reallocation to the at least one lower-ranked one of the simultaneously executing multiple software container workspaces after the reallocating and assigning the first amount of higher performance system memory to the at least one higher-ranked one of the simultaneously executing multiple software container workspaces.

15. The information handling system of claim 12, where the host programmable integrated circuit is further programmed to perform the ranking of the priority of the memory requirements of each of the simultaneously executing multiple software container workspaces relative to each other by:

monitoring at least a respective user context of each of the simultaneously executing software multiple container workspaces while they are executing on the host programmable integrated circuit of the first information handling system; and ranking the priority of the memory requirements of each of the simultaneously executing multiple software container workspaces relative to each other based on the monitored user context of each of the simultaneously executing software multiple container workspaces while they are executing on the host programmable integrated circuit of the first information handling system.

16. The information handling system of claim 15, where the host programmable integrated circuit is further programmed to perform the monitoring of at least a respective user context of each given one of the simultaneously executing software multiple container workspaces by monitoring whether or not a user of the first information handling system is currently interacting with the given one of the simultaneously executing software multiple container workspaces.

17. The information handling system of claim 12, where the software container workspace is a cloud-based software container workspace, where the information handling system is an endpoint client information handling system that is configured to be coupled by at least one network to a remote information handling system, and where the host programmable integrated circuit of the endpoint client system is further programmed to:

receive the cloud-based software container workspace as it is deployed across the network from the remote information handling system; and start and execute an instance of the deployed cloud-based software container workspace.

18. The information handling system of claim 12, where the host programmable integrated circuit is further programmed to reduce current memory requirements of the at least one lower-ranked one of the simultaneously executing multiple software container workspaces only if the system memory requirements of the at least one lower-ranked one of the simultaneously executing multiple software container workspaces exceeds a designated threshold amount of remaining available higher performance system memory and/or lower performance system memory that is available for reallocation to the at least one lower-ranked one of the simultaneously executing multiple software container workspaces after the host programmable integrated circuit has allocated and the assigned the determined amount of higher performance system memory to the at least one higher-ranked one of the simultaneously executing multiple software container workspaces.

19. The information handling system of claim 12, where the higher performance system memory is volatile dynamic random access memory (DRAM) and where the lower performance system memory is persistent non-volatile memory.

20. An information handling system, comprising:
  system memory comprising higher performance system memory and lower performance system memory; and
  a host programmable integrated circuit coupled to access the higher performance system memory and the lower performance system memory, the host programmable integrated circuit executing at least one software container workspace;
  where the host programmable integrated circuit is programmed to perform the following in real time while executing the at least one software container workspace:
    monitor system memory requirements of the at least one software container workspace while it is executing on the host programmable integrated circuit,
    determine an amount of the higher performance system memory required by the executing software container workspace to meet the monitored system memory requirements of the at least one software container workspace,
    allocate the determined amount of higher performance system memory to the executing software container workspace,
    assign the allocated amount of higher performance system memory to the executing software container workspace, and
    execute at least one software container workspace on the host programmable integrated circuit of the first information handling system while using the assigned amount of higher performance system memory to store data for operation of the executing software container workspace;
  where the higher performance system memory is volatile dynamic random access memory (DRAM) and where the lower performance system memory is persistent non-volatile memory; and
  where the lower performance persistent non-volatile memory is used to store data for operation of the executing software container workspace in a volatile condition on the persistent non-volatile memory.

\* \* \* \* \*